US009630132B2

(12) United States Patent
Spengler et al.

(10) Patent No.: US 9,630,132 B2
(45) Date of Patent: Apr. 25, 2017

(54) FLUID FILTERING SYSTEM

(71) Applicant: Caterpillar Inc., Peoria, IL (US)

(72) Inventors: Philip Spengler, Washington, IL (US); Vincent Paul Caliendo, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 80 days.

(21) Appl. No.: 14/321,480

(22) Filed: Jul. 1, 2014

(65) Prior Publication Data

US 2016/0001209 A1    Jan. 7, 2016

(51) Int. Cl.
*B01D 46/00*  (2006.01)
*B01D 46/12*  (2006.01)
*B01D 25/26*  (2006.01)
*B01D 46/52*  (2006.01)

(52) U.S. Cl.
CPC ........... *B01D 46/002* (2013.01); *B01D 25/26* (2013.01); *B01D 46/0039* (2013.01); *B01D 46/12* (2013.01); *B01D 46/522* (2013.01); *B01D 46/526* (2013.01)

(58) Field of Classification Search
CPC ........ B01D 46/12; B01D 46/52; B01D 46/10; B01D 25/26; B01D 25/24; B01D 25/00
See application file for complete search history.

(56) References Cited

U.S. PATENT DOCUMENTS

| 2,760,597 | A | * | 8/1956 | Brixius | B01D 45/04 55/440 |
| 3,020,977 | A | * | 2/1962 | Huppke | B01D 46/525 156/192 |
| 3,070,937 | A | * | 1/1963 | Bub | B01D 45/08 55/485 |
| 3,827,562 | A | * | 8/1974 | Esmond | A61M 1/3627 210/304 |

(Continued)

FOREIGN PATENT DOCUMENTS

| EP | 0829692 | | 3/1998 |
| JP | 63194139 A | * | 8/1988 |

(Continued)

OTHER PUBLICATIONS

JP 63194139 translation.*

*Primary Examiner* — Amber R Orlando
*Assistant Examiner* — Britanny Precht
(74) *Attorney, Agent, or Firm* — Finnegan, Henderson, Farabow, Garrett & Dunner, LLP

(57) ABSTRACT

A filter system may include a filter housing and a filter. The filter may include layers of impermeable material. Additionally, the filter may include at least one first layer of corrugated filter media situated between layers of the impermeable material. The at least one first layer may at least partially define a first plurality of flutes extending from a first side of the filter to a second side of the filter. The filter may also include at least one second layer of corrugated (Continued)

filter media situated between layers of the impermeable material. The at least one second layer may at least partially define a second plurality of flutes extending from a third side of the filter to a fourth side of the filter. The housing may be configured to direct a first fluid into the first side of the filter, and direct a second fluid into the third side of the filter.

10 Claims, 5 Drawing Sheets

(56) References Cited

U.S. PATENT DOCUMENTS

| | | | | |
|---|---|---|---|---|
| 3,847,211 A * | 11/1974 | Fischel | ................. | B01D 53/22 165/166 |
| 4,110,427 A * | 8/1978 | Kalat | ................. | A61K 8/044 424/66 |
| 4,199,387 A * | 4/1980 | Hladik | ................. | B01D 46/12 156/160 |
| 4,329,162 A * | 5/1982 | Pitcher, Jr. | ......... | B01D 39/2075 210/510.1 |
| 4,343,631 A * | 8/1982 | Ciliberti | ............... | B01D 46/002 55/302 |
| 4,377,400 A * | 3/1983 | Okamoto | ........... | B01D 46/0036 165/166 |
| 4,410,427 A * | 10/1983 | Wydeven | ............... | B01D 25/24 210/317 |
| 4,416,676 A * | 11/1983 | Montierth | ............... | B01D 25/26 210/510.1 |
| 4,417,908 A * | 11/1983 | Pitcher, Jr. | ......... | B01D 46/0001 210/510.1 |
| 4,460,388 A | 7/1984 | Fukami et al. | | |
| 4,589,983 A * | 5/1986 | Wydevan | ............... | B01D 25/24 210/317 |
| 4,594,162 A * | 6/1986 | Berger | ................. | B01D 29/111 156/205 |
| 4,678,578 A * | 7/1987 | Nodes | ................... | B01D 36/02 210/445 |
| 5,194,151 A * | 3/1993 | Broussard | ............. | E02B 15/046 210/242.3 |
| 5,391,112 A | 2/1995 | Wardlaw | | |
| 5,514,335 A * | 5/1996 | Leonard | ............. | A61M 1/1698 210/321.6 |
| 5,620,545 A * | 4/1997 | Braun | ................... | A62B 23/02 156/205 |
| 5,630,940 A * | 5/1997 | Van Rossen | ....... | B01D 46/0036 210/484 |
| 5,674,393 A * | 10/1997 | Terhune | ................. | B01D 27/06 210/315 |
| 6,143,174 A * | 11/2000 | Graus | ................. | B01D 29/012 210/321.61 |
| 6,145,588 A * | 11/2000 | Martin | ................... | F24F 3/147 165/133 |
| 6,635,104 B2 * | 10/2003 | Komkova | ............. | B01D 53/22 95/52 |
| 6,827,851 B1 * | 12/2004 | Strohm | ................. | B01D 25/26 210/228 |
| 7,228,891 B2 * | 6/2007 | Shin | ...................... | F24F 12/006 165/164 |
| 7,316,780 B1 * | 1/2008 | Fendya | ................ | A23C 9/1422 210/503 |
| 7,794,593 B2 * | 9/2010 | Schukar | ............... | B01D 61/246 210/321.6 |
| 7,959,702 B2 | 6/2011 | Rocklitz et al. | | |
| 8,328,897 B2 | 12/2012 | Nelson et al. | | |
| 8,460,442 B2 | 6/2013 | Wagner et al. | | |
| 2006/0107639 A1 * | 5/2006 | Hamlin | ................. | B01D 29/21 55/498 |
| 2011/0027136 A1 * | 2/2011 | Andersson | ........... | B01D 46/005 422/177 |

FOREIGN PATENT DOCUMENTS

WO    WO 82/02086    6/1982
WO    2010114906    10/2010

* cited by examiner

FLUID FILTERING SYSTEM

TECHNICAL FIELD

The present disclosure relates generally to filtering systems and, more particularly, to systems for filtering multiple fluids.

BACKGROUND

Many earth-working machines, such as, for example, loaders, graders, and excavators, include operator-compartments with heating, ventilation, and/or air conditioning systems ("HVAC systems"). Such systems typically supply an operator-compartment with a mix of air from outside of the compartment (i.e., outside air) and air from inside of the compartment (i.e., recirculated air). Since the outside air and the recirculated air may include various unwanted materials (e.g., dust particles), the systems often include filters for filtering out such materials.

U.S. Pat. No. 4,410,427 to Wydeven discloses an exemplary filter pack including alternating flat and corrugated layers of filter media. The combination of flat and corrugated layers creates hollow passages (i.e., flutes) in each of the corrugated layers. The corrugated layers of filter media on either side of each flat layer of filter media are oriented such that their corrugations (and flutes) are substantially orthogonal to each other. Fluids may enter a first set of the flutes through opposing entry sides of the filter pack, pass through the flat layers of filter media into a second set of flutes oriented substantially orthogonal to the first set of flutes, and exit the second set of flutes through opposing exit sides of the filter pack, which are oriented substantially orthogonal to the entry sides of the filter pack.

The filter pack of the '427 patent may provide certain benefits in some applications. However, it may have certain drawbacks. For example, although the opposing entry sides of the filter pack may allow two different fluids to enter the filter pack, the fluids would mix in the filter pack and thus be filtered by the same filter media. As a result, it might not be possible to tailor the filter media to the different fluids being filtered. For example, in an HVAC system for an operator-compartment, it may be desirable to subject outside air to more stringent filtering than recirculated air. Accomplishing this might require the use of two of the filter packs of the '427 patent, one for the outside air and one for the recirculated air, increasing both the space required in the compartment for the filters and the maintenance time associated with changing the filters. The disclosed embodiments may help solve these problems.

SUMMARY

One disclosed embodiment relates to a filter. The filter may include a plurality of layers of impermeable material. Additionally, the filter may include at least one first layer of corrugated filter media situated between a first pair of the layers of impermeable material. The at least one first layer may at least partially define a first plurality of flutes extending parallel to a first axis from a first side of the filter to a second side of the filter. The filter may also include at least one second layer of corrugated filter media situated between a second pair of the layers of impermeable material. The at least one second layer may at least partially define a second plurality of flutes extending parallel to a second axis from a third side of the filter to a fourth side of the filter.

Another disclosed embodiment relates to filter system for filtering a first fluid and a second fluid. The system may include a filter housing and a filter. The filter may include a plurality of layers of impermeable material. Additionally, the filter may include at least one first layer of corrugated filter media situated between a first pair of the layers of impermeable material. The at least one first layer may at least partially define a first plurality of flutes extending parallel to a first axis from a first side of the filter to a second side of the filter. The filter may also include at least one second layer of corrugated filter media situated between a second pair of the layers of impermeable material. The at least one second layer may at least partially define a second plurality of flutes extending parallel to a second axis from a third side of the filter to a fourth side of the filter. The housing may be configured to, when the filter is installed in the housing, direct the first fluid into the first side of the filter, and direct the second fluid into the third side of the filter.

A further disclosed embodiment relates to a method of filtering a first fluid and a second fluid using a filter. The filter may include a plurality of layers of impermeable material. The filter may also include at least one first layer of corrugated filter media situated between a first pair of the layers of impermeable material. The at least one first layer may at least partially define a first plurality of flutes extending from a first side of the filter to a second side of the filter. The filter may also include at least one second layer of corrugated filter media situated between a second pair of the layers of impermeable material. The at least one second layer may at least partially define a second plurality of flutes extending from a third side of the filter to a fourth side of the filter. The method may include directing the first fluid into the first side of the filter, through the first plurality of flutes, and out the second side of the filter. In addition, the method may include directing the second fluid into the third side of the filter, through the second plurality of flutes, and out the fourth side of the filter.

DETAILED DESCRIPTION

Figure 1:
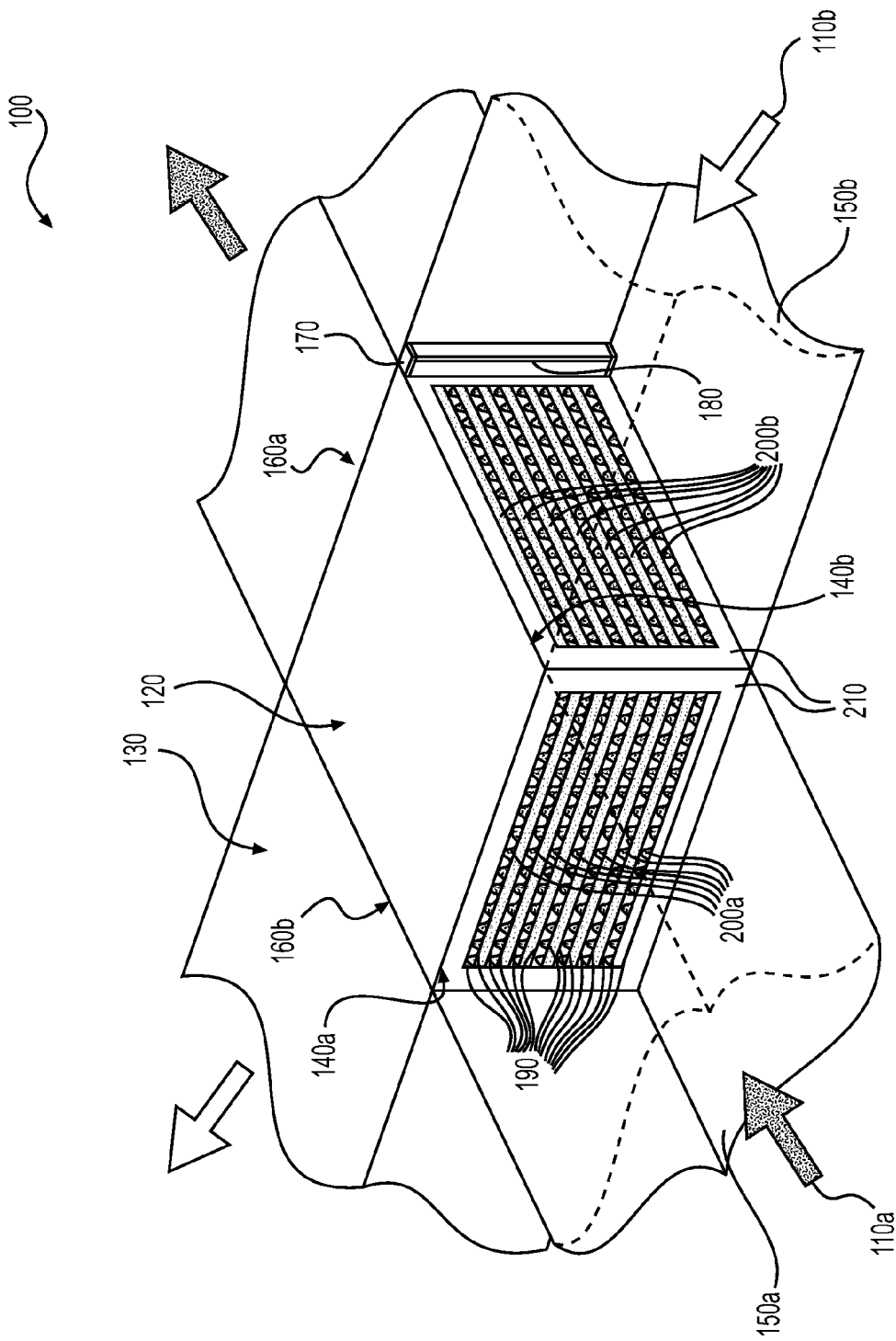
FIG. 1 is a perspective view of a fluid filtering system according to the present disclosure.

FIG. 1 illustrates an exemplary fluid filtering system 100 of an HVAC system for an operator-compartment of a machine. For example, the machine may be an earth-working machine, a truck, a car, a train, a plane, or another type of machine with an operator-compartment. Filtering system 100 may filter multiple fluids 110a, 110b. For example, filtering system 100 may filter air from outside of the compartment (i.e., outside air) and air from inside of the compartment (i.e., recirculated air). The HVAC system may supply the filtered outside air and the filtered recirculated air to the operator-compartment separately. Alternatively, the HVAC system may mix the filtered outside air with the filtered recirculated air, and supply the mixture to the operator-compartment. For example, a ratio of the filtered outside air to the filtered recirculated air in the mixture may be greater than 1:1. In one embodiment, the ratio may be approximately 4:1.

Filtering system 100 may include a filter 120, which may be installed in a filter housing 130. As shown, housing 130 may be configured to, when filter 120 is installed, direct fluid 110a into an input side 140a of filter 120, and direct fluid 110b into an input side 140b of filter 120. For example, housing 130 may include input ducts 150a, 150b for directing fluids 110a, 110b into input sides 140a, 140b, respectively. Fluids 110a, 110b directed into input sides 140a, 140b of filter 120 may pass through filter 120, where they may be filtered, and out of output sides 160a, 160b of filter 120.

In some embodiments, filter 120 may be configured to filter fluids 110a, 110b in different ways. For example, filter 120 may be configured to filter a greater amount of fluid 110a than fluid 110b. Alternatively or additionally, filter 120 may be configured to filter differing materials from fluids 110a, 110b. For example, in embodiments in which fluid 110a is outside air and fluid 110b is recirculated air, filter 120 might be configured to filter certain materials from fluid 110a that would typically be found in outside air. However, filter 120 might not necessarily be configured to filter these same materials from fluid 110b if they were not typically found in recirculated air. In such embodiments, the orientation of filter 120 relative to housing 130 may impact the way in which filter 120 filters fluids 110a, 110b.

To ensure that filter 120 is correctly oriented relative to housing 130, filter 120 and housing 130 may be configured to limit the possible number of orientations of filter 120 when it is installed in housing 130. For example, sides 140a, 140b, 160a, 160b of filter 120 may have different lengths to limit the possible number of orientations. Alternatively, at least one of sides 140a, 140b, 160a, 160b may include a protrusion extending out of filter 120 corresponding to a recess extending into housing 130, or may include a recess extending into filter 120 corresponding to a protrusion extending out of housing 130. For example, as shown in FIG. 1, side 160a may include a protrusion 170 corresponding to a recess 180 of housing 130, which may limit the possible number of orientations of filter 120 relative to housing 130 to one. Although protrusion 170 is shown as a rail extending along side 160a, it should be understood that protrusion 170 could alternatively be a single tab so long as it prevents filter 120 from being installed in undesirable orientations.

Still referring to FIG. 1, filter 120 may include a plurality of layers 190 of impermeable material (e.g., glue-impregnated filter media). In addition, filter 120 may include a plurality of layers 200a, 200b of corrugated filter media. For example, filter 120 may include at least one layer 200a, which may be situated between a pair of layers 190. Filter 120 may also include at least one layer 200b, which may be situated between a pair of layers 190. Layers 200a, 200b may differ from each other. For example, as shown, the corrugations of the at least one layer 200a may be angled with respect to the corrugations of the at least one layer 200b. In one embodiment, the corrugations may be approximately perpendicular to each other, while in other embodiments, the corrugations may be otherwise angled relative to each other. As another example of how layers 200a, 200b may differ from each other, the at least one layer 200a may be a different type of filter media than the at least one layer 200b. For example, the type of filter media of the at least one layer 200a may be tailored to filter unwanted materials typically found in fluid 110a, while the type of filter media of the at least one layer 200b may be tailored to filter unwanted materials typically found in fluid 110b. For example, types of filter media include cellulose, synthetic, glass, and mixed filter media.

Layers 190, 200a, 200b may be held together by a sealing material 210, which may be, for example, free rise urethane or acrylic beading. Alternatively, layers 190, 200a, 200b may be held together by a structural frame formed of, for example, plastic, cardboard, or another rigid material. As shown, layers 200a, 200b may be arranged in an alternating configuration. That is, every pair of layers 200a may be separated from each other by a layer 200b, and every pair of layers 200b may be separated from each other by a layer 200a. Alternatively, a plurality of layers 200a may not be separated from each other by any layer 200b, and/or a plurality of layers 200b may not be separated from each other by any layer 200a. In such embodiments, filter 120 may include more layers 200a than layers 200b, or may include more layers 200b than layers 200a. For example, in one exemplary embodiment, a ratio of the number of layers 200a to the number of layers 200b may be approximately 4:1.

Figure 2:
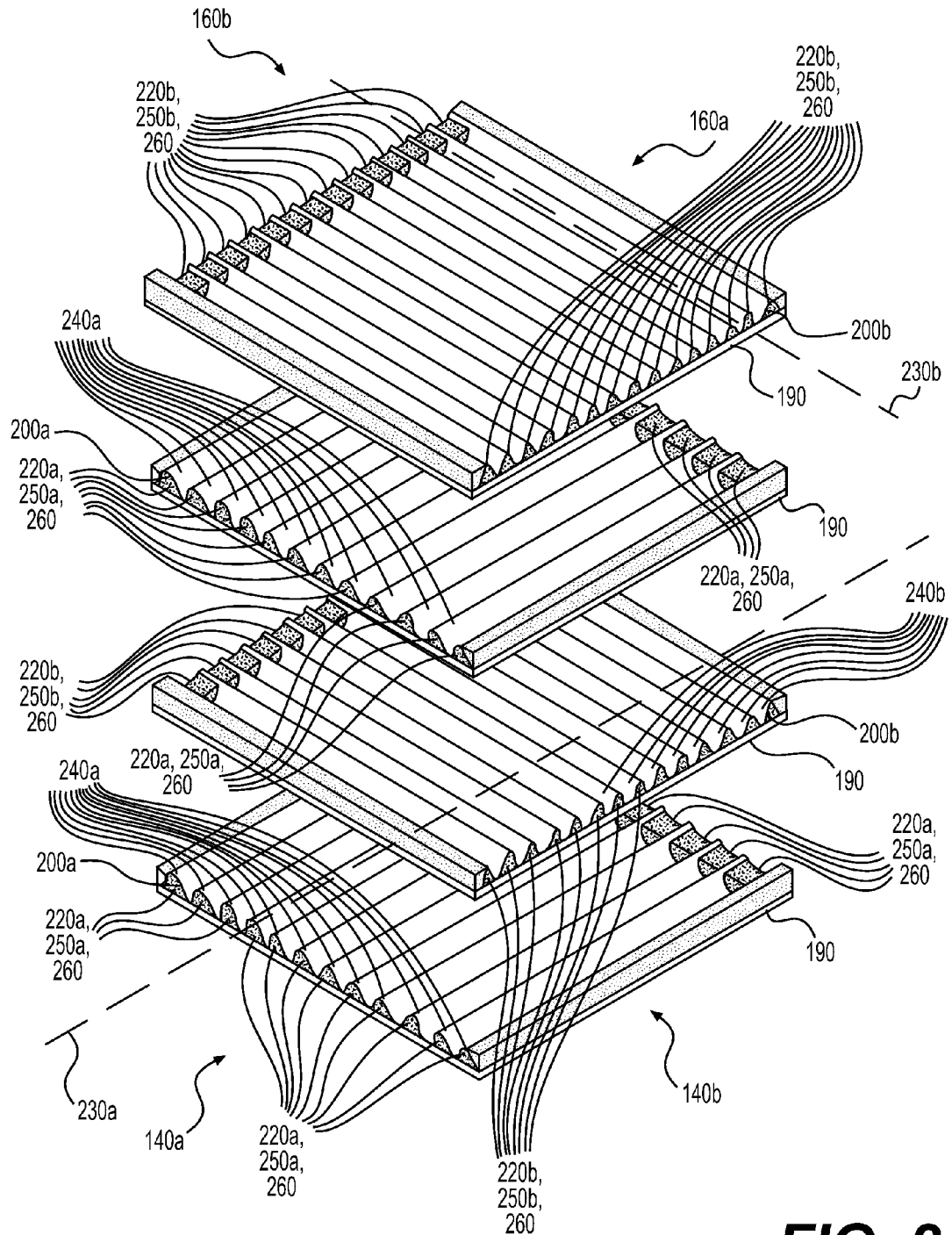
FIG. 2 is an exploded view of layers of the filtering system of FIG. 1.

Referring to FIG. 2, each of layers 200a, 200b may, in combination with a pair of layers 190, define a plurality of flutes 220a, 220b, respectively. As shown, flutes 220a may extend parallel to a filter axis 230a from input side 140a of filter 120 to output side 160a of filter 120, while flutes 220b may extend parallel to a filter axis 230b from input side 140b to output side 160b of filter 120. Axis 230a may be approximately perpendicular to axis 230b. Alternatively, axis 230a may be otherwise angled relative to axis 230b. Although flutes 220a, 220b are illustrated as being approximately the same length, it should be understood that flutes 220a, 220b may be different lengths in some embodiments. For example, all or some of flutes 220a may be longer than flutes 220b. Alternatively, all or some of flutes 220b may be longer than flutes 220a.

Each of flutes 220a, 220b may include one open end 240a, 240b and one sealed end 250a, 250b, respectively. For example, sealed ends 250a, 250b may be sealed with a sealing material 260. In some embodiments, sealing material 260 may be the same as sealing material 210. In other embodiments, sealing material 260 may be different from sealing material 210. For example, sealing material 260 may be free rise urethane, felt, or glue-impregnated media. As shown, each pair of adjoining flutes 220a may include one open end 240a and one sealed end 250a, and each pair of adjoining flutes 220b may include one open end 240b and one sealed end 250b. Alternatively, some pairs of adjoining flutes 220a may include two open ends 240a or two sealed ends 250a, and/or some pairs of adjoining flutes 220b may include two open ends 240b or two sealed ends 250b.

Figure 3A:
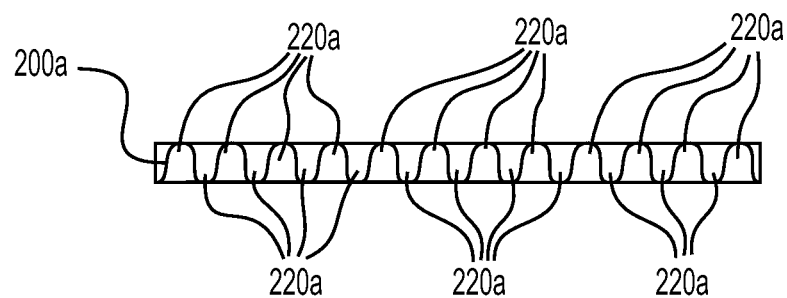
FIGS. 3A-3E are cross-sections of layers of corrugated filter media according to the present disclosure.
Figure 3B:
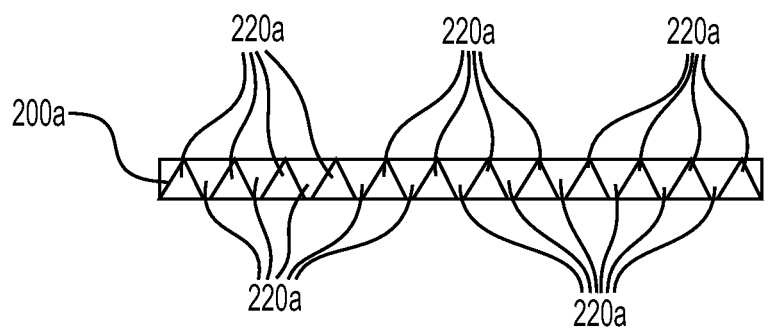
Figure 3C:
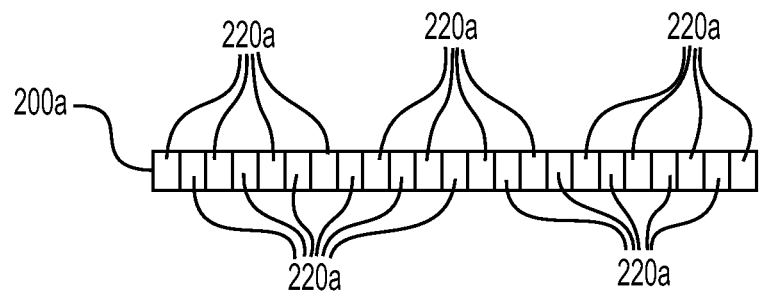
Figure 3D:
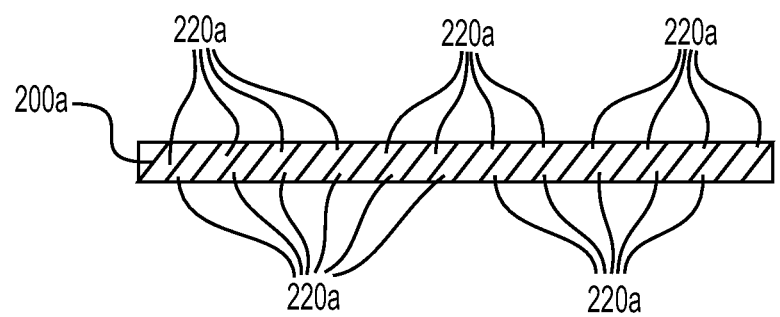
Figure 3E:
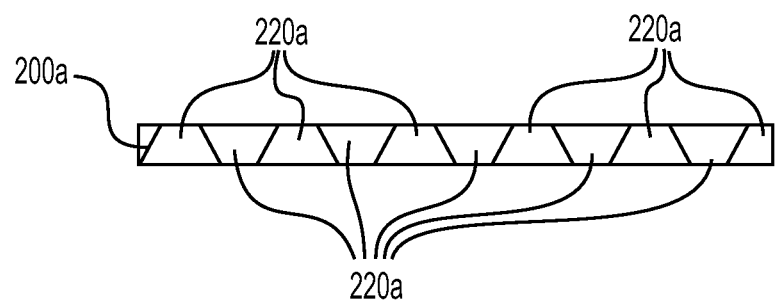

Referring to FIGS. 3A-3E, when viewed along filter axis 230a, a cross-section of each of layers 200a may at least partially define a cross-section of each flute 220a. For example, as shown in FIG. 3A, cross-sections of flutes 220a may be at least partially curve-shaped, when viewed along filter axis 230a. Alternatively, as shown in FIG. 3B, cross-sections of flutes 220a may be at least partially triangle-shaped, when viewed along filter axis 230a. In yet another alternative, as shown in FIG. 3C, cross-sections of flutes 220a may be at least partially rectangle-shaped, when viewed along filter axis 230a. Alternatively, as shown in FIG. 3D, cross-sections of flutes 220b may be at least partially parallelogram-shaped, when viewed along filter axis 230a. In yet another alternative, as shown in FIG. 3E, cross-sections of flutes 220b may be at least partially trapezoid-shaped, when viewed along filter axis 230a. Alternatively, flutes 220a may be any combination of the shapes shown in FIGS. 3A-3E, and may be the same as or different from each other.

Similar to layers 200a, when viewed along filter axis 230b, a cross-section of each of layers 200b may at least partially define a cross-section of each flute 220b. These cross-sections may be shaped like those of layers 200a and flutes 220a, respectively. Thus, flutes 220b may be any combination of the shapes shown in FIGS. 3A-3E, and may be the same as or different from each other.

The configuration of filtering system 100 is not limited to the configurations discussed above and shown in the drawings. For example, rather than having four sides and being configured to filter two fluids, as discussed above, filter 120 may have N sides and be configured to filter N/2 fluids, with each fluid being directed into an input side of filter 120 and out of an output side of filter 120. In such configurations, system 100 may filter each of the N/2 fluids in different ways.

Figure 4:
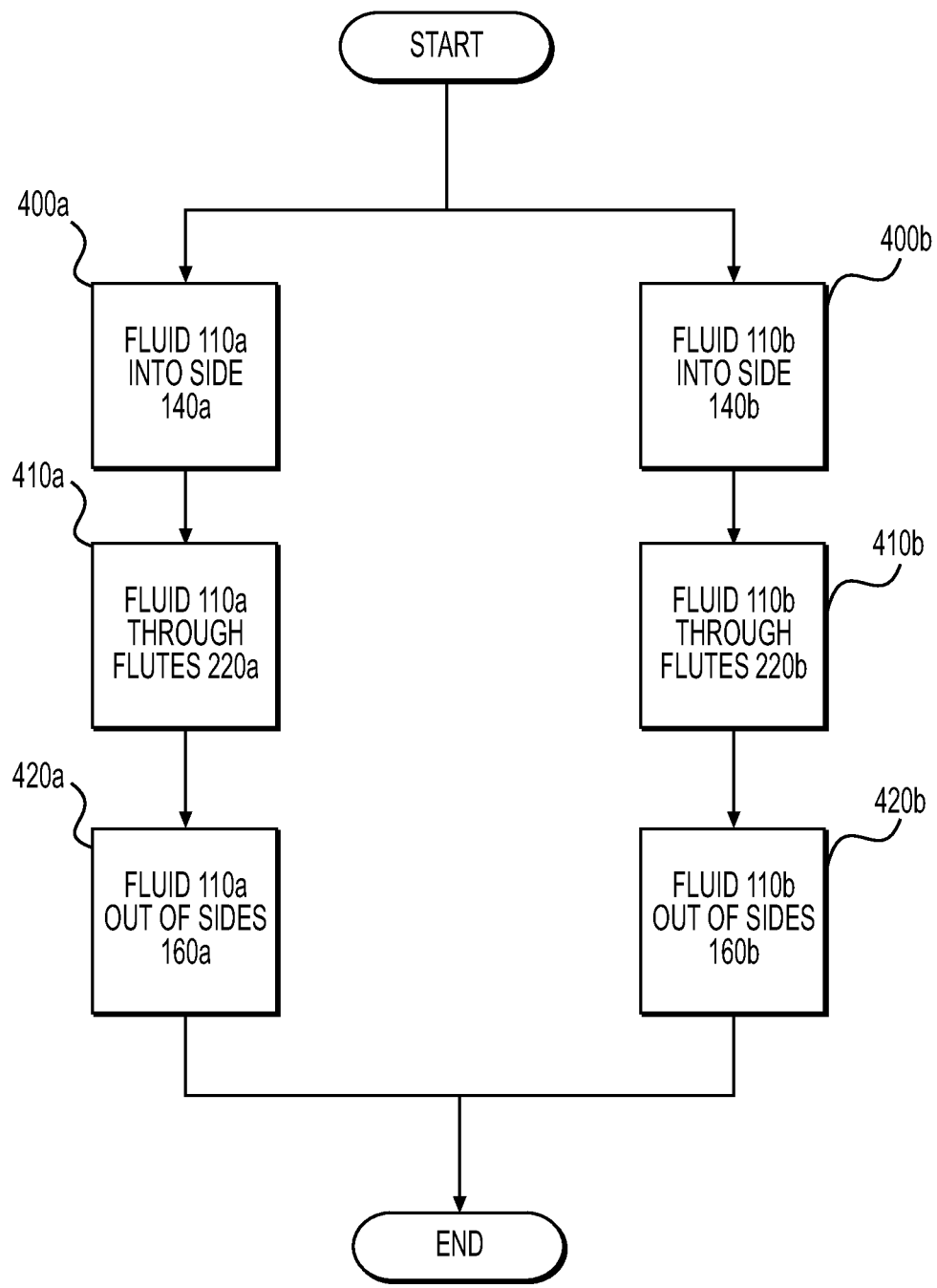
FIG. 4 is a flow chart describing a method of filtering a first fluid and a second fluid using the filtering system of FIG. 1.

FIG. 4 is a flow chart describing a method of filtering fluids 110a and 110b using system 100, and it will be discussed in the following section.

INDUSTRIAL APPLICABILITY

Fluid filtering system 100 may be applicable to an HVAC system for an operator-compartment of a machine, such as, for example, an earth-working machine, a truck, a car, a train, a plane, or another type of machine. System 100 may have various advantages over prior art filtering systems. For example, system 100 may filter multiple fluids, each in a different way. In the context of an HVAC system for an operator-compartment, system 100 may thus be able to filter outside air in one way while filtering recirculated air in another way. As a result, it may be possible to reduce the number of filters required for the HVAC system, freeing up space in the operator-compartment and minimizing the maintenance time associated with changing filters. A method of filtering fluids 110a and 110b, which may be outside air and recirculated air, respectively, using filter 120 of system 100 will now be described.

Referring to FIG. 4, housing 130 may direct fluid 110a into input side 140a of filter 120 (step 400a), and may direct fluid 110b into input side 140b of filter 120 (step 400b). In some embodiments, for example, those with more layers 200a than 200b, an amount of fluid 110a directed into side 140a may be greater than an amount of fluid 110b directed into side 140b. In other embodiments, the amounts may be the same. In any case, housing 130 may direct fluid 110a into flutes 220a having open ends 240a on side 140a, and may direct fluid 110b into flutes 220b having open ends 240b on side 140b. As discussed above, each flute 220a, 220b may have one open end 240a, 240b and one sealed end 250a, 250b, so these flutes 220a, 220b into which fluids 110a, 110b are directed may have sealed ends 250a, 250b on output sides 160a, 160b, respectively, of filter 120. These sealed ends 250a, 250b may direct fluids 110a, 110b through the filter media of layers 200a, 200b into adjoining flutes 220a, 220b having open ends 240a, 240b on sides 160a, 160b, where fluids 110a, 110b may exit the adjoining flutes 220a, 220b on sides 160a, 160b of filter 120. Fluids 110a, 110b may thus be directed through flutes 220a, 220b (steps 410a, 410b) and out sides 160a, 160b (steps 420a, 420b), respectively, of filter 120.

Notably, during steps 410a, 410b, fluids 110a, 110b may be unable to pass through the impermeable material of layers 190, so fluids 110a, 110b may be unable to flow from flutes 220a to flutes 220b, or from flutes 220b to flutes 220a. As a result, fluids 110a, 110b may remain separated from each other as they pass through filter 120, enabling them to be filtered in different ways. For example, fluid 110a may be filtered as it passes through the filter media of layers 200a, while fluid 110b may be filtered as it passes through the filter media of layers 200b. By configuring filter 120 with different types of filter media for layers 200a, 200b, it may thus be possible to tailor filter 120 to filter different unwanted materials from fluids 110a, 110b based on what unwanted materials are typically found in fluids 110a, 110b.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A filter, comprising:
    a plurality of layers of impermeable material;
    at least one first layer of corrugated filter media situated between a first pair of the layers of impermeable material, and at least partially defining a first plurality of flutes extending parallel to a first axis from a first side of the filter to a second side of the filter; and
    at least one second layer of corrugated filter media situated between a second pair of the layers of impermeable material, and at least partially defining a second plurality of flutes extending parallel to a second axis from a third side of the filter to a fourth side of the filter,
    wherein the at least one first layer and the at least one second layer of corrugated filter media are different types of filter media and each of the first plurality of flutes includes one open end and one sealed end along the direction the first plurality of flutes extend, and each pair of adjoining flutes of the first plurality of flutes includes one open end and one sealed end adjacent each other.

2. The filter of claim 1, wherein the first plurality of flutes is longer than the second plurality of flutes.

3. The filter of claim 1, wherein the first axis and the second axis are approximately perpendicular to each other.

4. The filter of claim 1, wherein cross-sections of the first plurality of flutes are at least partially curve-shaped when viewed along the first axis.

5. The filter of claim 1, wherein the impermeable material is glue-impregnated filter media.

6. The filter of claim 1, wherein at least one of the sides of the filter includes a protrusion extending out of the filter or a recess extending into the filter.

7. A filter system for filtering a first fluid and a second fluid, comprising:
    a filter housing; and
    a filter including:
        a plurality of layers of impermeable material;
        at least one first layer of corrugated filter media situated between a first pair of the layers of impermeable material, and at least partially defining a first plurality of flutes extending parallel to a first axis from a first side of the filter to a second side of the filter; and
        at least one second layer of corrugated filter media situated between a second pair of the layers of impermeable material, and at least partially defining a second plurality of flutes extending parallel to a second axis from a third side of the filter to a fourth side of the filter, wherein the at least one first layer and the at least one second layer of corrugated filter media are different types of filter media, wherein the housing is configured to, when the filter is installed in the housing, direct the first fluid into the first side of the filter, and direct the second fluid into the third side of the filter, and wherein the housing and the filter are configured to limit the possible number of orientations of the filter when the filter is installed in the housing to only one possibility.

8. The filter system of claim 7, wherein the first plurality of flutes is longer than the second plurality of flutes.

9. The filter system of claim 7, wherein at least one of the sides of the filter includes a protrusion extending out of the filter or a recess extending into the filter.

10. The filter system of claim 7, wherein the first axis and the second axis are approximately perpendicular to each other.

* * * * *